(12) United States Patent
Leiserson et al.

(10) Patent No.: US 6,473,766 B1
(45) Date of Patent: Oct. 29, 2002

(54) METHOD AND SYSTEM FOR MODIFYING TEXT FILES FOR COMPUTER CONFIGURATION

(75) Inventors: Jay L. Leiserson; Paul David Lewis, both of Austin; Bryce Allen Curtis; Educardo N. Spring, both of Round Rock, all of TX (US); Rosalie Jensen Brown, Preston, ID (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,847

(22) Filed: Mar. 31, 2000

(51) Int. Cl.$^7$ ............................................. G06F 17/30
(52) U.S. Cl. ...................................... 707/102; 707/200
(58) Field of Search ..................... 707/10, 102, 103 R, 707/200; 345/744; 713/100; 717/105, 108, 116, 118

(56) References Cited

U.S. PATENT DOCUMENTS

| | | | |
|---|---|---|---|
| 5,974,256 A | * 10/1999 | Matthews et al. | 717/118 |
| 5,978,834 A | 11/1999 | Simonoff et al. | 709/203 |
| 5,991,534 A | * 11/1999 | Hamilton et al. | 345/744 |
| 6,005,568 A | 12/1999 | Simonoff et al. | 345/744 |

FOREIGN PATENT DOCUMENTS

JP 2001318791 A * 11/2001 ............. G06F/9/44

* cited by examiner

*Primary Examiner*—Diane D. Mizrahi
*Assistant Examiner*—Apu M Mofiz
(74) *Attorney, Agent, or Firm*—Robert H. Frantz; David A. Mims, Jr.

(57) ABSTRACT

A product action bean is provided for updating lines and keywords in computer system configuration flat text or ASCII files, which is especially useful for during installation of software applications on computer systems. In its embodiment as a Java Bean, it is customized and configured using a visual application builder across multiple computing platforms. The primary bean is a container bean, which includes an engine, and which provides a graphical user interface ("GUI") that developers can easily specify the required changes along with the file name to be changed when an application is installed or uninstalled. The container bean also contains a set of action beans which perform operations to modify the ASCII file, such as finding strings or lines, adding strings or lines, and deleting strings or lines. The specified actions are performed as a "unit of work" in the customized bean. Alternate classes of objects for modifying text files may be included in the container bean to expand the action options available to the developer.

40 Claims, 6 Drawing Sheets

METHOD AND SYSTEM FOR MODIFYING TEXT FILES FOR COMPUTER CONFIGURATION

CROSS-REFERENCE TO RELATED APPLICATIONS

(CLAIMING BENEFIT UNDER 35 U.S.C. 120) AND INCORPORATION BY REFERENCE

This application is related to pending U.S. patent application Ser. No. 09/280,348, filed by Bryce Allen Curtis, et al, on Mar. 29, 1999, which is hereby incorporated by reference in its entirety.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

The present invention relates to systems, methods, tools, programs, and data structures employed to design and implement scripts and programs which modify computer text files, especially text files which determine and control the configuration of a computer system.

2. Description of the Related Art

Computer systems and computer-based systems often contain text files, or "ASCII files", stored in their memories and on their non-volatile disk drives. Common text files on IBM-compatible personal computers include the system AUTOEXEC.BAT file and the CONFIG.SYS file, as well as other batch script (*.BAT) and command (*.cmd) files. Many computer systems also have standard text files used by the operating system, such as program registry files and initialization files for Win32 systems. Most operating systems, including IBM's OS/2 and AIX, Microsoft's Windows, UNIX, and LINUX employ text files extensively for storage of system parameters and configuration information. When new programs or applications are installed on the computer, typically several text files must be updated to reflect the presence and settings of the new program.

When writing an installation program, the installation program developer must create a program, usually in the form of a script file, to update certain system configuration files that are stored in text or ASCII format. For example, in the Windows operating system, the AUTOEXEC.BAT and CONFIG.SYS files may need to be updated after installing a program to place the directory of the installed program in the "path" line of the AUTOEXEC.BAT file. Current installation-specific tools available to software programmers such as "InstallShield" from InstallShield Software Corporation, and "Install Anywhere" from ZeroG, allow the programmer to script these changes to system text files using low-level commands typically from a proprietary scripting language. The software developer uses these low-level commands to create a program which will read each line of the text file to be modified, parse the line, modify the line, and re-write the line (or file).

As these scripting languages are not similar or related to well-known programming languages such as "C", "C++", and Java, the software developer must learn and develop expertise with these scripting languages, which results in a loss of programming efficiency.

In the related application, systems, methods, and data structures are disclosed which allow software developers to create programs to modify computer system text files using a class of objects in Java, thereby increasing the efficiency of the process to develop an installation program. However, while this method is an improvement over the existing available technologies of proprietary scripts, it still requires familiarity and expertise in a standard programming language, such as Java.

Therefore, there is a need in the art for a system and method which allows creation of programs to modify computer system text files without the need for in-depth expertise in either a proprietary or standard programming language. This system and method should preferably allow creation of these programs using a visual development methodology to allow a user to "point and click" to build a program. Further, there is a need for this new system and method to be compatible with a wide variety of computer platforms, hardware, and operating systems, as the need for the ability to modify text files is present on many system types.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

A product action bean is provided which allows updating lines and keywords in a flat text or ASCII file, which is especially useful for installation of software applications on computer systems. In its embodiment as a Java Bean, it is available for use with visual application builders across multiple computing platforms. The primary bean is a container bean, which includes an engine, and which provides a graphical user interface ("GUI") that developers can easily specify the required changes along with the file name to be changed when an application is installed or uninstalled. The container bean also contains a set of action beans which perform operations to modify the ASCII file, such as finding strings or lines, adding strings or lines, and deleting strings or lines. The specified actions are performed as a "unit of work" by the product action bean. Alternate classes of objects for modifying text files may be included in the container bean to expand the action options available to the developer.

BRIEF DESCRIPTION OF THE DRAWINGS

The following detailed description when taken in conjunction with the figures presented herein present a complete description of the present invention.

The AddLine/Text action bean GUI panel, which is displayed on a portion of a computer screen, is shown in FIG. 6.

DETAILED DESCRIPTION OF THE INVENTION

The invention is preferably realized as a set of Java Beans running on a Java-compatible computer platform. Many computer platforms are capable of executing Java and Java Bean code, including IBM-compatible personal computers running Microsoft Windows, IBM OS/2 or LINUX operating systems. Sun Microsystem's workstations running their Solaris operating system as well as Apple's iMac are also capable of executing Java code.

The use of Java Bean technology allows not only for cross-platform compatibility, but also allows for efficient integration of the invention into standard visual builder tools which are popular in the software development community. Beans are familiar to programmers who use Delphi or Visual Basic, as well. A Java Bean is a reusable software component that works with Java, and it can be visually manipulated in builder tools. While Java Beans may vary in functionality, most share defining features such as (a) support for "introspection" which allows a builder tool to determine how the bean works, (b) support for customization to the appearance and behavior of the bean, (c) support for events or actions, (d) support for programmatically manipulating the bean through properties, and (e) support for persistence which allows the state of the bean to be saved and restored.

By implementing the invention as a set of Java Beans, the user is enabled to customize the action beans through the use of a visual builder tool, typically referred to simply as "builder tools". Such tools are usually GUI applications in which there is a palette of components available from which a program designer can drag items and place them on a form or client window. The form, or client window, represents the target application which is being created or modified, such as in this case a text file modification program. After completion, the target application may be executed independently of the builder tool. The GUI for a builder tool typically presents a "property sheet", or "property editor", or uses a "properties window", used to modify the properties and actions (events) for each bean or component.

Customization of a Bean is done by selecting action items from the property sheet. This invokes a custom Bean editor to select a specific event from a list of actions that can be generated by an Animation Bean. A list of actions is acquired through introspection.

Figure 1:
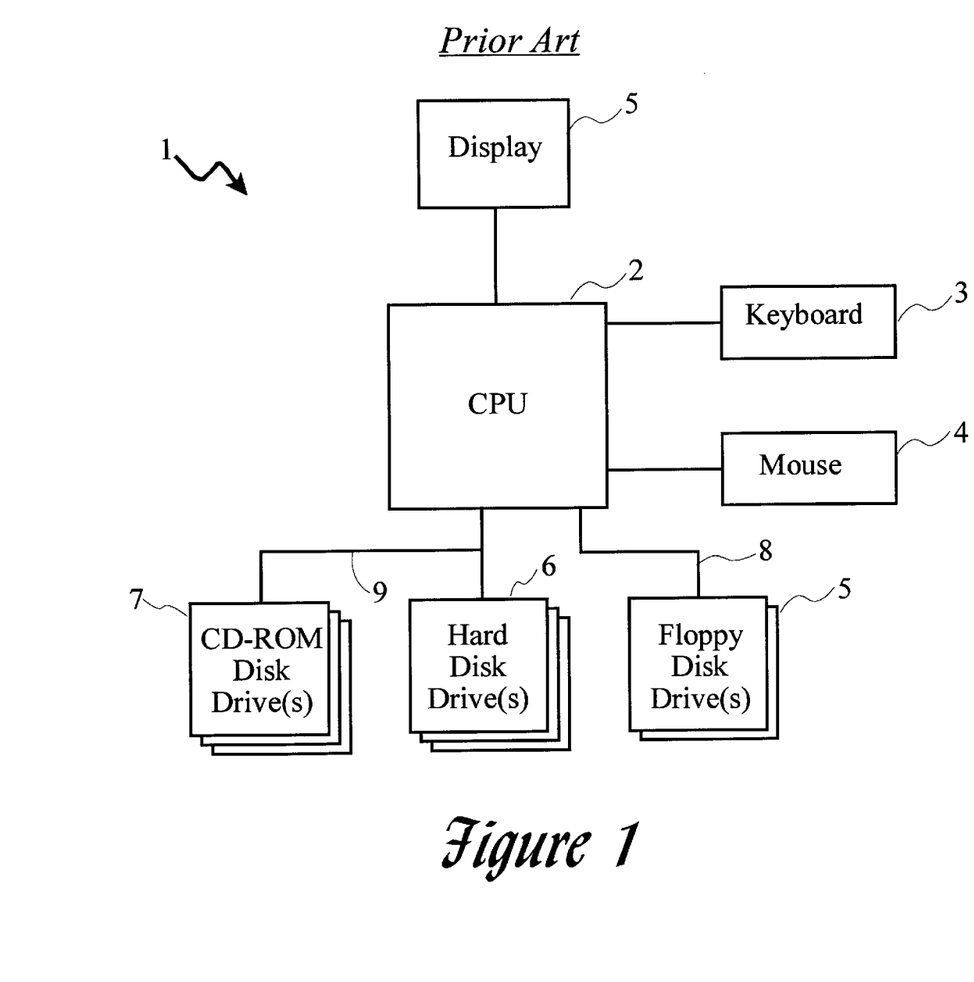
FIG. 1 shows the general architecture of a typical data processing system, i.e. a personal computer, in which the invention may be realized.

FIG. 1 shows the general architecture of a typical data processing system (1), i.e. a personal computer, in which the invention may be realized. A central processing unit ("CPU") (2) interfaces to a variety of I/O devices such as a keyboard (3), monitor or display (5) and a mouse (4). The CPU (2) also may interface to a number of storage peripherals including CD-ROM drives (7), hard disk drives (6), and floppy drives (5). Typically, floppy disk drives interface to the CPU via Integrated Drive Electronics ("IDE") (8), but this interface may alternately be one of several other standard interfaces or a proprietary interface. The hard disk drives (6) and CD-ROM drives (7) may interface to the CPU (2) via an IDE or Small Computer System Interface ("SCSI"), as shown (9).

Figure 2:
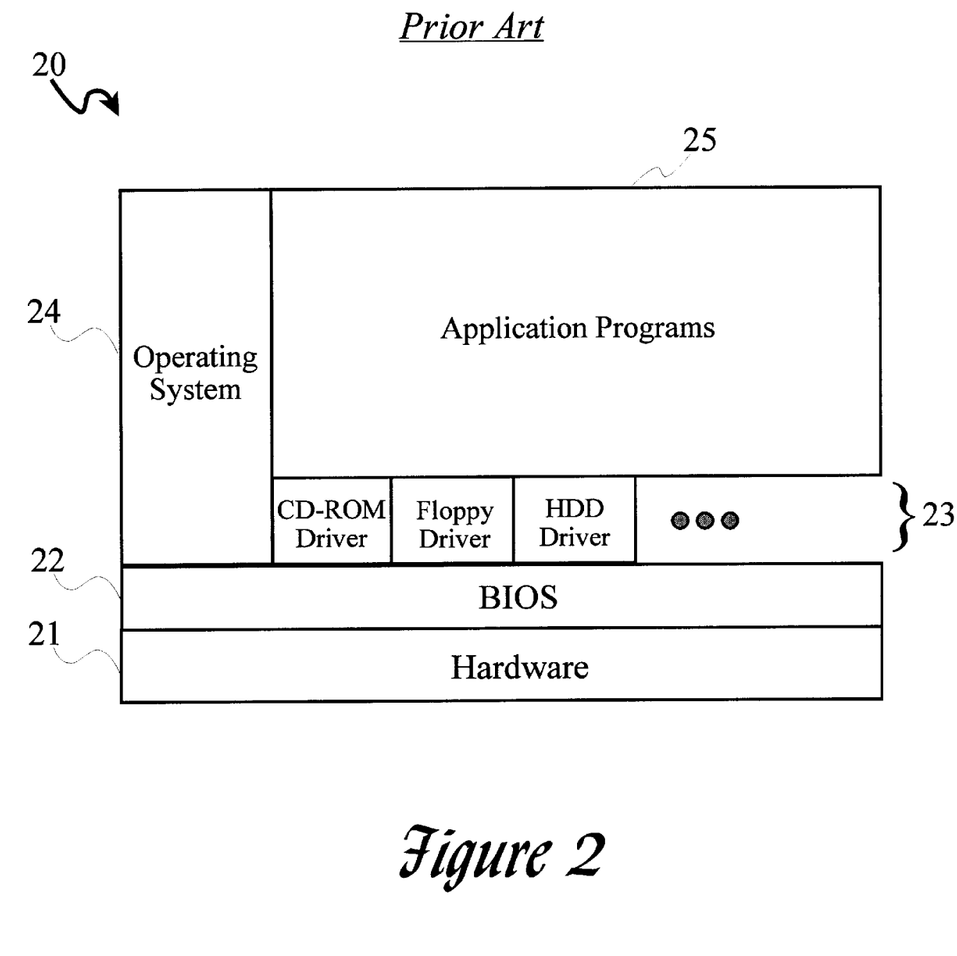
FIG. 2 shows a generalization of the hardware, firmware and software organization of a personal computer system.

FIG. 2 shows a generalization of the hardware, firmware and software organization of a personal computer system (20). The hardware group (21) includes the persistent storage devices discussed supra, as well as other system hardware components such as a real-time clock, keyboard controller, display adapter, etc. A basic input/output system ("BIOS") (22) provides the direct firmware control of these system components typically. An operating system (24) such as the IBM OS/2 operating system, Microsoft Windows, or LINUX, provides high level management of the system resources, including the multi-tasking or multi-threaded scheduling and prioritization of the system application programs (25). This generalized view of the system also applies to systems on alternate, non-IBM-compatible platforms, such as workstations, which employ a variety of operating systems such as Sun Microsystem's Solaris or UNIX. This general organization of computer system resources and software functionality is well understood in the art.

The aforementioned computer system architecture and component organization description is provided solely for the purposes of explaining the invention, and is exemplary in nature. Those skilled in the art will recognize that many variations are possible, both in form and function, without departing from the spirit and scope of the invention disclosed herein. For example, the components of the computer system may be physically co-located or co-resident, such as an self-contained computer system, or they may be distributed over a computer network. Also, the operating system, processor choice, and object-oriented programming language used in the actual implementation may be varied.

In the preferred embodiment, a product action bean called "UpdateASCIIFile" is provided which allows updating lines and keywords in a flat text or ASCII file. It is provided as a part of application builder cross platforms. "UpdateASCIIFile" is a container bean, which includes an engine, "ModifyFile.class", which provides a graphical user interface ("GUI") that developers can easily specify the required changes along with the file name to be changed when an application is installed or uninstalled. The container bean also contains a set of action beans which perform operations to modify the ASCII file. This collection of operations is be performed as a "unit of work". At runtime, the ASCII file is opened by the product action bean and copied to computer system memory, the operations are performed on the copy of the ASCII file in memory, and the original file is replaced with the memory copy and closed. With this method, either all of the operations contained in the UpdateACIIFile bean are committed, or none of them are. This prevents corruption of and ASCII file when an install or uninstall operation is unsuccessful.

The product action bean provides a set of GUI panels through which the user can specify files to be modified and actions to be taken to modify the files. This allows complete definition of the text file modification "script" or program without the need for use of a programming language. By implementing the invention using Java Beans, the invention is compatible and useful on a wide range of computer hardware platforms and operating systems.

Figure 3:
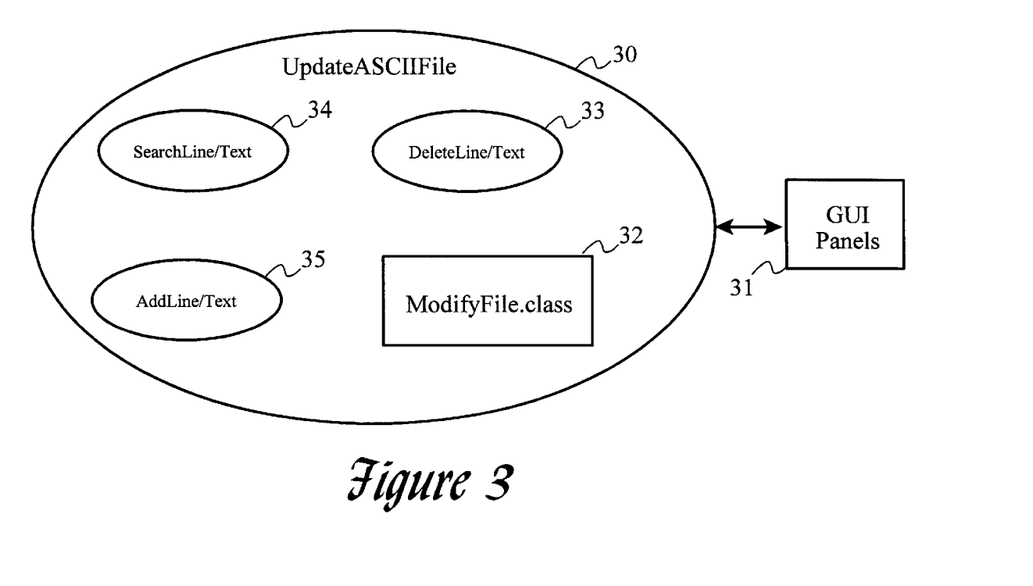
FIG. 3 discloses a conceptual view of the un-customized UpdateASCIIFile container bean (30).
Figure 8:
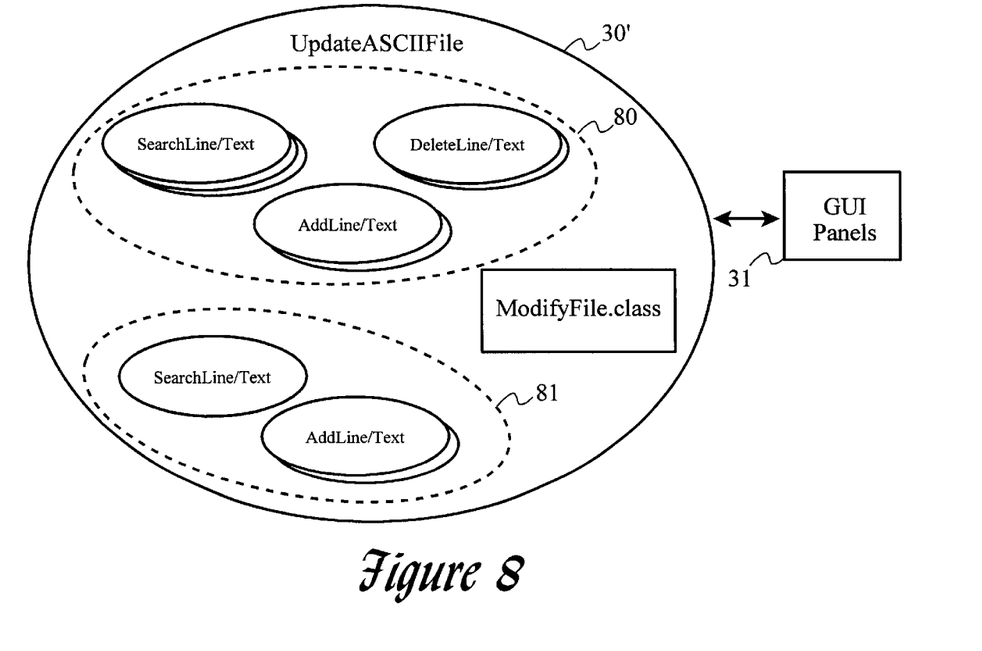
FIG. 8 depicts a customized UpdateASCIIFile bean with multiple instances of each action defined.

Turning to FIG. 3, a conceptual view of the un-customized UpdateASCIIFile container bean (30) is shown, having a Graphical User Interface ("GUI") (31) to the user, the engine ModifyFile.class (32), and un-customized instances of the Search bean (34), Delete bean (33), and Add bean (35). FIG. 8 shows a customized UpdateASCIIFile container bean (30'), in which two units of work (80 and 81) have been customized to include multiple instances of the search, add and delete beans. Following completion of building the customized bean using a builder tool, the customized bean may be executed on any suitable computer platform independently of the builder tool. In the preferred embodiment, java1.2 and swing2 are included in the environment on the computer system.

The following descriptions of the invention provide more detail as to the functionality, logic, control, customization, and use of the individual beans in the invention.

UpdateASCIIFile

UpdateASCIIFile is a container bean. It contains a set of action beans which perform operations to modify the ASCII text file. This collection of operations is performed as a "unit of work". At runtime, the ASCII or text file is opened and copied to computer system memory, the operations are performed on the copy of the file stored in memory, and then the file is replaced (written) and closed. Therefore, either all of the operations contained in the UpdateASCIIFile bean are committed or none of them are. This prevents corruption of an ASCII file when an install or uninstall operation is unsuccessful or terminated abnormally.

The UpdateASCIIFile bean has properties that the developer can set as shown in TABLE 1.

TABLE 1

UpdateASCIIFile Bean Properties

| Properties | Type | Description |
|---|---|---|
| File | String | The path to the file to be modified. Format: [drive letter]:\[path] |
| CommentChars | String | Comment characters will be used to comment out a line in a configuration file such as REM, #, etc. |
| RebootRequired | Boolean | Flag indicating whether or not updates to this file made during application installation require the system to be rebooted before the application can successfully run. |
| Actions | Update Actions[] | A collection of action beans listed in the next section. |

Figure 4:
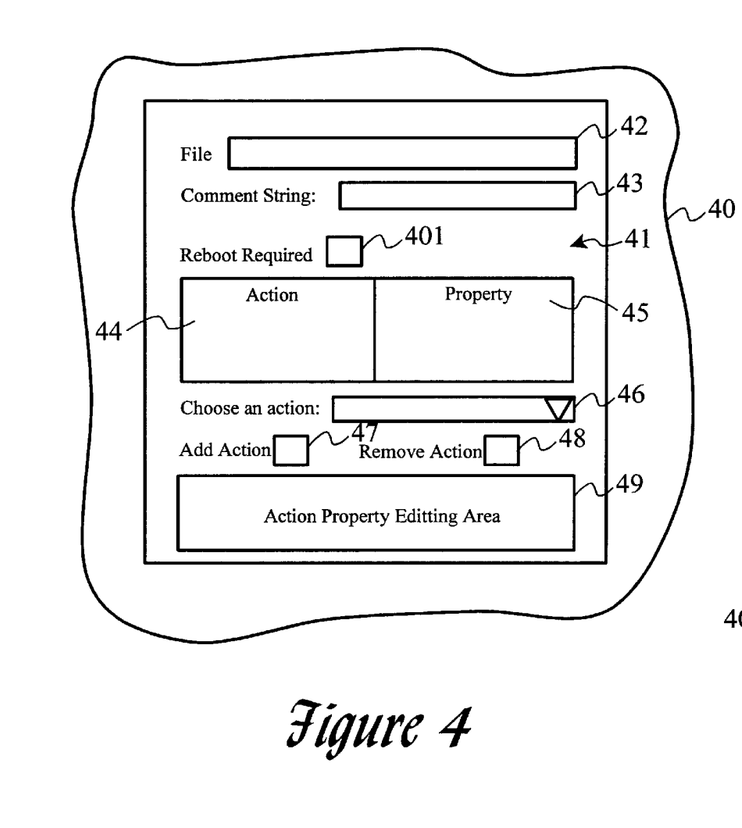
FIG. 4 shows the basic GUI for the UpdateASCIIFile bean, which is displayed on a portion of a computer display.

FIG. 4 shows the basic GUI for the UpdateASCIIFile bean, which is displayed on a portion (40) of a computer display. This panel (41) represents the main panel for UpdateASCIIFile bean. The developer may enter a fully qualified path for the intended text file (42), may indicate a desired comment string (43), and may select the "reboot required" checkbox (401) if desired. The "Choose an action" pull down menu (46) offers a list of action beans for file modifications. By selecting an action bean, its property editor will be displayed in "Action property editing area" (49). After completing the required data for the properties of the selected action bean, the user may select, or click on, the "add action" button (47), which adds an instance of the action bean to the selected actions list. Since the actions will be executed sequentially in the modified product bean, it is important to select the correct actions in the appropriate sequence. For example, a search action must be selected before a delete line in order to find and then delete a line. The "remove action" button (48) allows the developer to remove unwanted actions from the list (49).

Search Line/Text Action Bean

Figure 5:
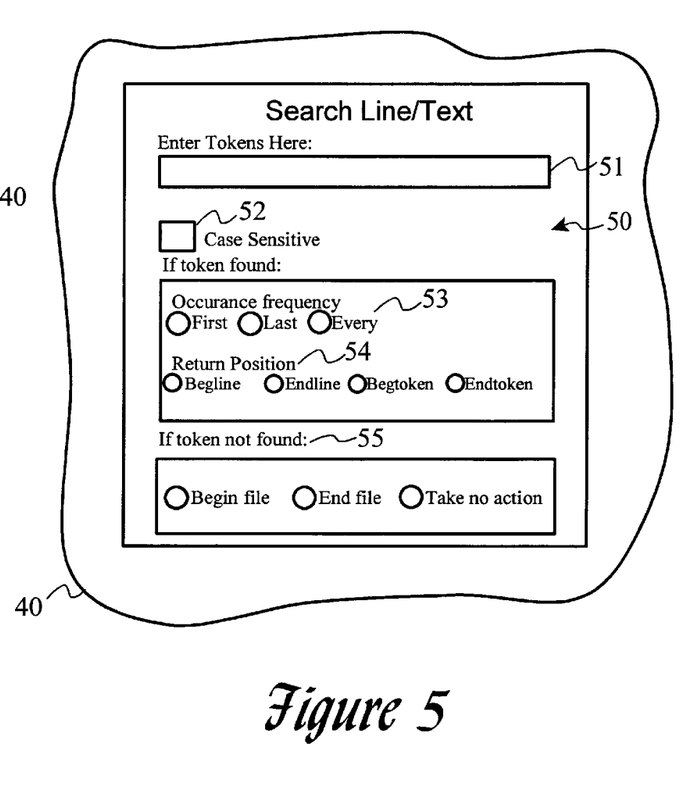
FIG. 5 shows the GUI panel for the SearchLine/Text action bean which is displayed on a portion of a computer screen.

The SearchLine/Text bean allows the developer to specify a search criteria to find lines in the text file. TABLE 2 sets forth the properties of the SearchLine/Text bean, and FIG. 5 shows the GUI panel for this bean which is displayed on a portion of a computer screen (40).

TABLE 2

Properties of the SearchLine/Text Bean

| Properties | Type | Description |
|---|---|---|
| TokensString [] | | A vector of tokens that must be present in a line or text in the order specified to satisfy the search. |
| RespectCase | Boolean [] | Any array flags, one for each token. Indicates whether case must be respected when searching for the token. |
| Occurrence Freq | Checkbox | A group of Check boxes with (if token is found) radio behavior from which the developer selects one of the following (when token is found):<br>(a) First: Only select the first line found<br>(b) Last: Only select the last line found<br>(c) Every: Select all the lines found |
| Return Position | Checkbox | A group of Check boxes with (if token is found) radio behavior from which the developer selects one of the following (when token is found):<br>(a) Begline: Returns a pointer to the beginning of line<br>(b) Endline: Returns a pointer to the end of line<br>(c) Begtoken: Returns a pointer to the beginning of text<br>(d) Endtoken: Returns a pointer to the end of text |
| If token not found | Checkbox | A group of Check boxes with radio behavior from which the developer selects one of the following (when token is not found):<br>(a) Begline: Returns a pointer to the beginning of file<br>(b) Endline: Returns a pointer to the end of file<br>(c) Take no action: Flags that the search was unsuccessful and let the follow up action beans know it. |

The search is conducted for a line or string of text based on the selection of return position flags (e.g. selecting begline or endline indicates a search for a line). Multiple tokens can be entered with a ',' separator. A line is selected and added to the results vector if all tokens exist on the line in the order specified (Boolean search "AND"). There are two sets of actions that need to be specified based on the result of the search: if the search is successful, the developer can specify the desired occurrence and a pointer to the desired return position. If Begtoken is selected, be search bean will return a pointer to the beginning of the first token found in the line. If Endtoken is selected, the returned pointer will point to the end of the first token found in the line.

If the token is not found, the developer can still request a pointer to the beginning or the end of the file, or just set the flag that the search was unsuccessful and communicate it with the follow up actions. Multiple search beans can be selected on after another. In this case, "Take no action" flag invokes the next search.

Add Line/Text Bean

The AddLine/Text bean allows the developer to add lines or text to an ASCII file. The properties of this bean are shown in TABLE 3, and the AddLine/Text GUI panel which is displayed on a portion of a computer screen (40) is given in FIG. 6.

TABLE 3

Properties of the AddLine/Text Bean

| Properties | Type | Description |
|---|---|---|
| Add | Checkbox Group | A group of Check boxes with radio behavior from which the developer selects one of the following:<br>(a) Line: Select to add line(s)<br>(b) Text: Select to add text<br>(c) Comment: Select to add comment |
| Lines | String [] | A vector of lines. |

Figure 6:
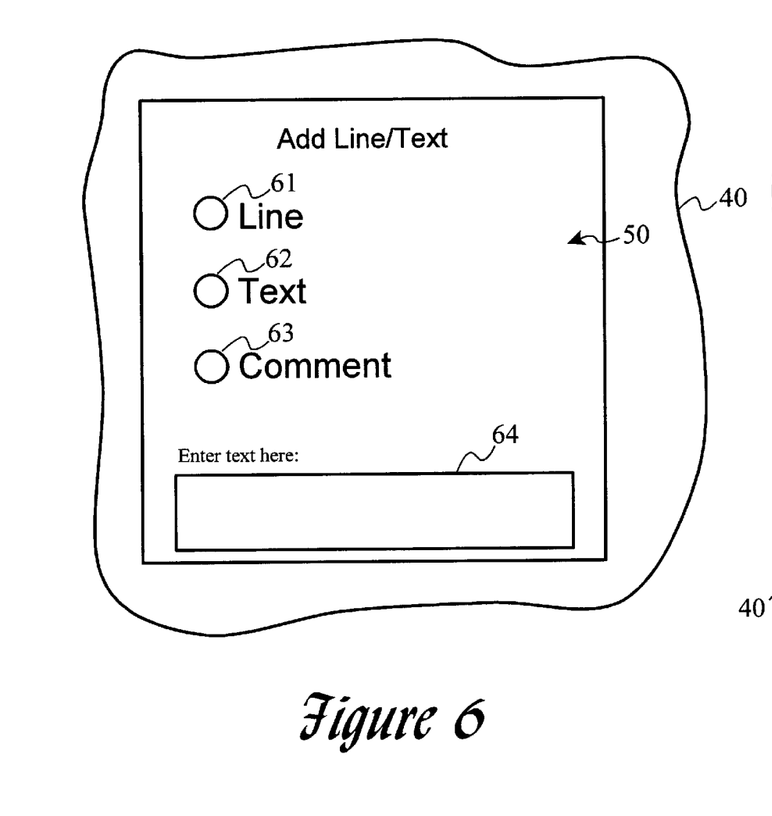

The properties of the AddLine/Text bean include options to add a line (61), add a string of text (62), or add a comment (63) to the file being modified, as shown in FIG. 6 in the AddLine/Text panel (60). If the developer wishes to add a complete line of text to the text file, he or she first specifies a Search action (as described supra), which, if successful, returns a pointer to the Begfile, Endfile, Begline, or Endline. The developer next specifies an AddLine/Text action, selects "line" (61) on the AddLine/Text panel (60), and types in the text of the line to be added in the "enter text here" form space (64) on the panel (60). The text is added to the file being modified, followed by a line feed character.

If the developer wants the script being generated to add a string of text before or after a token in a line in the file being modified, a Search action is first specified for the token, which, if successful, returns a pointer to the Begtoken or Endtoken. The developer then specifies, or adds to the action list, the AddLine/Text bean, selects the "text" button (62) on the panel (60), and inputs the text string to be added in the appropriate portion (64) of the panel. If the text string is being inserted relative to Begtoken, then the text string is inserted followed by a white space. The text string is being inserted relative to the Endtoken, the text is inserted followed by a line feed character.

If the developer wishes to convert a line of text in the file being modified to a comment line ("comment out an existing line"), he first specifies a Search action, and second specifies a AddLine/Text action, selecting the "comment" button (63) on the panel (60). The beans will find the indicated line (in the Search), and insert a predefined comment string, such as "/*" or "//", at the beginning of the found line.

Delete Line/Text

Figure 7:
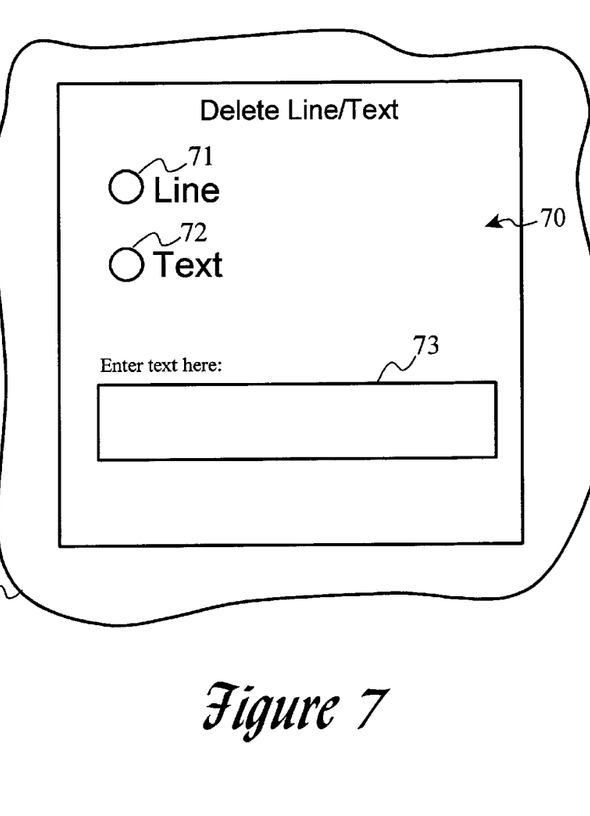
FIG. 7 illustrates the GUI panel used to control the DeleteLine/Text action bean.

The DeleteLine/Text action bean add lines or text strings to the text file being modified, as has the properties shown in TABLE 4. FIG. 7 illustrates the GUI panel used to customize the DeleteLine/Text action bean.

TABLE 4

Properties of the DeleteLine/Text Bean

| Properties | Type | Description |
|---|---|---|
| Delete | Checkbox | A group of Check boxes with radio behavior from which the developer selects one of the following:<br>(a) Delete Line: Select to delete line<br>(b) Delete Text: Select to delete text |
| Lines | String [] | A vector of lines. |

In order to specify a line or text string deletion action in the script being generated by the builder tool, the developer first specifies a Search action as previously described, and next specifies a DeleteLine/Text action. If he or she wishes to delete an entire line of text from the text file being modified, the "delete line" button (71) on the DeleteLine/Text action bean GUI panel (70) is selected. In such as case, the entire line which was found during the Search action is deleted from the file being modified. If the developer wishes to delete only a specific string of text from a line, the string is specified (73) on the panel (70), and the DeleteLine/Text bean will place the modified line of text in the file being modified, if it exists in the line originally.

Storing of Modified File

In the preferred embodiment, the UpdateASCIIFile bean opens the specified file to be modified, copies it to computer system memory for a "working copy", and performs the actions specified to the working copy of the file. After all actions have been successfully made to the working copy, the working copy is written over the original file, replacing the original unmodified file with the modified file.

It will be understood by those skilled in the relevant arts and from the foregoing description that various modifications and changes may be made in the preferred embodiment of the present invention without departing from its true spirit, such as the use of alternate programming languages which support object-oriented design and the concept of beans, use of various operating systems and file storage means.

Thus, the invention enables a software developer to create an executable program which modifies text files on a computer system through a completely visual development methodology and without the need for learning or knowing either proprietary scripting languages or standard scripting languages. Additionally, the invention is portable and may be used with a number of visual builder tools on a wide variety of computer platforms running many different operating systems.

Further, the action beans disclosed form a basis for the invention, but as with all other object-oriented software components, other text file modifying beans can easily be added to or substituted in the UpdateASCIIFile container bean, such as those disclosed in the related application, in order to expand the functionality of the product. It is intended that this description is for purposes of illustration only and should not be construed in a limiting sense. The scope of this invention should be limited only by the language of the following claims.

What is claimed is:

1. A method for creating customized software beans for modifying computer system configuration text files which are disposed in a computer system, said computer system having computer-readable media and a processor with operating system capable of executing bean software objects, said method comprising the steps of:

providing a container bean with an engine disposed in said computer-readable media and executable by said processor and operating system, said container bean being suitable for containing a plurality of other beans and being suitable for customization and control by a visual builder tool through which said container bean presents a user interface panel for display to a user by said computer system, said user interface panel allowing a user to specify properties, actions and events for control and customization of said container bean;

providing at least one action bean contained within said container bean, each of said action bean displaying a action bean interface panel to a user, said action bean interface panels allowing a user to specify properties, actions and events for control and customization of said action beans; and using a visual builder tool to customize said container bean and action beans through manipulation and specification of properties, events and actions using said interface panels such that said container bean and action beans are customized to modify computer system configuration text files.

2. A method for creating customized software beans for modifying computer system configuration text files as set forth in claim 1, wherein said step of providing at least one action bean further comprises providing a search line action bean which searches for a line in a text file based upon user-specified text contents of the line, and which provides a pointer to a found line's position within a text file for use by other action beans within said container bean.

3. A method for creating customized software beans for modifying computer system configuration text files as set forth in claim 1, wherein said step of providing at least one action bean further comprises providing a text string search action bean which searches for a string of text in a text file based upon user-specified text strings, and which provides a pointer to a found string's position within a a line in a text file for use by other action beans within said container bean.

4. A method for creating customized software beans for modifying computer system configuration text files as set forth in claim 1, wherein said step of providing at least one action bean further comprises providing an add line action bean which adds a line of text to a text file based upon a user-specified insertion position within a text file, and which allows said insertion position to be specified absolutely or relative to a pointer value.

5. A method for creating customized software beans for modifying computer system configuration text files as set forth in claim 1, wherein said step of providing at least one action bean further comprises providing an add text string action bean which adds a string of text to a line of text in a text file based upon a user-specified insertion position within a line of text in the text file, and which allows said insertion position to be specified absolutely or relative to a pointer value.

6. A method for creating customized software beans for modifying computer system configuration text files as set forth in claim 1, wherein said step of providing at least one action bean further comprises providing a delete line action bean which deletes a line of text from a text file based upon a user-specified deletion position within a text file, and which allows said deletion position to be specified absolutely or relative to a pointer value.

7. A method for creating customized software beans for modifying computer system configuration text files as set forth in claim 1, wherein said step of providing at least one action bean further comprises providing a delete text string action bean which deletes a string of text from a line of text in a text file based upon a user-specified deletion position within a line of text in the text file, and which allows said deletion position to be specified absolutely or relative to a pointer value.

8. A method for creating customized software beans for modifying computer system configuration text files as set forth in claim 1, wherein said steps of providing a container bean and providing at least one action bean further comprises providing a Java container bean and providing at least one Java action bean.

9. A computer program product for creating customized software beans for modifying computer system configuration text files which are disposed in a computer system, said computer system having computer-readable media and a processor with operating system capable of executing bean software objects, said computer program product comprising:

a computer usable medium having computer readable program code means embodied in said medium having a container bean with an engine disposed in said computer-readable media and executable by said processor and operating system, said container bean being suitable for containing a plurality of other beans and being suitable for customization and control by a visual builder tool through which said container bean presents a user interface panel for display to a user by said computer system, said user interface panel allowing a user to specify properties, actions and events for control and customization of said container bean;

a computer usable medium having computer readable program code means embodied in said medium having at least one action bean contained within said container bean, each of said action bean displaying a action bean interface panel to a user, said action bean interface panels allowing a user to specify properties, actions and events for control and customization of said action beans; and a computer usable medium having computer readable program code means embodied in said medium having a visual builder tool to customize said container bean and action beans through manipulation and specification of properties, events and actions using said interface panels such that said container bean and action beans are customizable for modification of computer system configuration text files.

10. A computer program product for creating customized software beans for modifying computer system configuration text files according to claim 9, wherein said computer usable medium having at least one action bean further comprises a computer usable medium having a search line action bean adapted for searching for a line in a text file based upon user-specified text contents of the line, and returning a pointer to a found line's position within a text file for use by other action beans within said container bean.

11. A computer program product for creating customized software beans for modifying computer system configuration text files according to claim 9, wherein said computer usable medium at least one action bean further comprises a computer usable medium having a text string search action bean adapted for searching for a string of text in a text file based upon user-specified text strings, and returning a pointer to a found string's position within a a line in a text file for use by other action beans within said container bean.

12. A computer program product for creating customized software beans for modifying computer system configuration text files according to claim 9, wherein said computer usable medium having at least one action bean further comprises a computer usable medium having a line addition action bean adapted for adding a line of text to a text file based upon a user-specified insertion position within a text file, said insertion position being specifiable absolutely or relative to a pointer value.

13. A computer program product for creating customized software beans for modifying computer system configuration text files according to claim 9, wherein said computer usable medium having at least one action bean further comprises a computer usable medium having a text string addition text string action bean adapted for adding a string of text to a line of text in a text file based upon a user-specified insertion position within a line of text in the text file, said insertion position being specifiable absolutely or relative to a pointer value.

14. A computer program product for creating customized software beans for modifying computer system configuration text files according to claim 9, wherein said computer usable medium having at least one action bean further comprises a computer usable medium having a line deletion action bean adapted for deletion of a line of text from a text file based upon a user-specified deletion position within a text file, said deletion position being specifiable absolutely or relative to a pointer value.

15. A computer program product for creating customized software beans for modifying computer system configuration text files according to claim 9, wherein said computer usable medium having at least one action bean further comprises a computer usable medium having a text string deletion action bean adapted for deleting a string of text from a line of text in a text file based upon a user-specified deletion position within a line of text in the text file, said deletion position being specifiable absolutely or relative to a pointer value.

16. A computer program product for creating customized software beans for modifying computer system configuration text files according to claim 9, wherein said computer usable medium having a container bean and computer usable medium having at least one action bean further comprise computer useable mediums having a Java container bean and at least one Java action bean.

17. A system for developing programs for modifying computer system configuration text files for installation of software applications onto computers, said system comprising:
- a computing platform capable of executing software, having computer-readable memory, a user display device, and a user input device;
- an operating system disposed in said computer-readable memory and executed by said computer platform, said operating system being capable of executing software beans;
- a product action bean disposed in said computer-readable memory and executed by said operating system and computing platform, said product action bean having at least one user interface control panel displayable on said user display device such that a user may customize the product action bean to perform modifications to computer system configuration text files through selection of properties, actions and events using said user input device.

18. A system for developing programs for modifying computer system configuration text files according to claim 17 wherein said user display device comprises a cathode ray tube display.

19. A system for developing programs for modifying computer system configuration text files according to claim 17 wherein said user display device comprises a solid state panel display.

20. A system for developing programs for modifying computer system configuration text files according to claim 17 wherein said user input device comprises a keyboard.

21. A system for developing programs for modifying computer system configuration text files according to claim 17 wherein said user input device comprises a mouse.

22. A system for developing programs for modifying computer system configuration text files according to claim 17 wherein said computing platform comprises an IBM-compatible personal computer.

23. A system for developing programs for modifying computer system configuration text files according to claim 17 wherein said computing platform comprises an Sun Microsystems workstation.

24. A system for developing programs for modifying computer system configuration text files according to claim 17 wherein said computing platform comprises an IBM RS/6000 workstation.

25. A system for developing programs for modifying computer system configuration text files according to claim 17 wherein said computing platform comprises IBM OS/2.

26. A system for developing programs for modifying computer system configuration text files according to claim 17 wherein said computing platform comprises IBM AIX.

27. A system for developing programs for modifying computer system configuration text files according to claim 17 wherein said computing platform comprises Microsoft Windows.

28. A system for developing programs for modifying computer system configuration text files according to claim 17 wherein said computing platform comprises LINUX.

29. A system for developing programs for modifying computer system configuration text files according to claim 17 wherein said computing platform comprises Sun Microsystems' Solaris.

30. A system for developing programs for modifying computer system configuration text files according to claim 17 wherein said computing platform comprises UNIX.

31. A system for developing programs for modifying computer system configuration text files according to claim 17 wherein said product action bean further comprises a container bean with an engine, said container bean being suitable for containing a plurality of action beans, and having a graphical user interface panel displayed on said user display device, said graphical user interface having displays and inputs for specification of bean properties, events and actions such that a user may customize the container bean to modify computer system configuration text files.

32. A system for developing programs for modifying computer system configuration text files according to claim 31 wherein container bean further comprises a plurality of action beans contained within the container bean.

33. A system for developing programs for modifying computer system configuration text files according to claim 32 wherein said action beans further comprise a line search bean adapted to search for lines within a computer system configuration text file which contain user-specified text, said user-specified text being configurable through said graphical user interface, and said line search bean being adapted to return a line position pointer indicating the position of the found line.

34. A system for developing programs for modifying computer system configuration text files according to claim 32 wherein said action beans further comprise a text string search bean adapted to search for string of user-specified text within text lines in a computer system configuration text file, said user-specified text string being configurable through said graphical user interface, and said text string search bean being adapted to return a line position pointer indicating the position of the found text string and line.

35. A system for developing programs for modifying computer system configuration text files according to claim 32 wherein said action beans further comprise a line addition bean adapted to add a line of user-specified text to a computer system configuration text file, said user-specified text being configurable through said graphical user interface, and said line addition bean being adapted to insert said line of text at a position within a computer system configuration text file which is specified absolutely or relative to a pointer value.

36. A system for developing programs for modifying computer system configuration text files according to claim 32 wherein said action beans further comprise a text string addition bean adapted to add a string of user-specified text to a line of to a computer system configuration text file, said user-specified text being configurable through said graphical user interface, and said line addition bean being adapted to insert said line of text at a position within a line in a computer system configuration text file which is specified absolutely or relative to a pointer value.

37. A system for developing programs for modifying computer system configuration text files according to claim 32 wherein said action beans further comprise a line deletion bean adapted to delete a line of text from a computer system configuration text file at a user-specified location within a computer system configuration text file, said user-specified line position being configurable through said graphical user interface and specifiable absolutely or relative to a pointer value.

38. A system for developing programs for modifying computer system configuration text files according to claim 32 wherein said action beans further comprise a text string deletion bean adapted to delete a string of text located at a user-specified position within a line of a computer system configuration text file, said user-specified position being configurable through said graphical user interface and specifiable absolutely or relative to a pointer value.

39. A system for developing programs for modifying computer system configuration text files according to claim 32 wherein said action beans further comprise Java beans.

40. A system for developing programs for modifying computer system configuration text files according to claim 17 wherein said product action bean is a Java bean.

* * * * *